Figure 3:
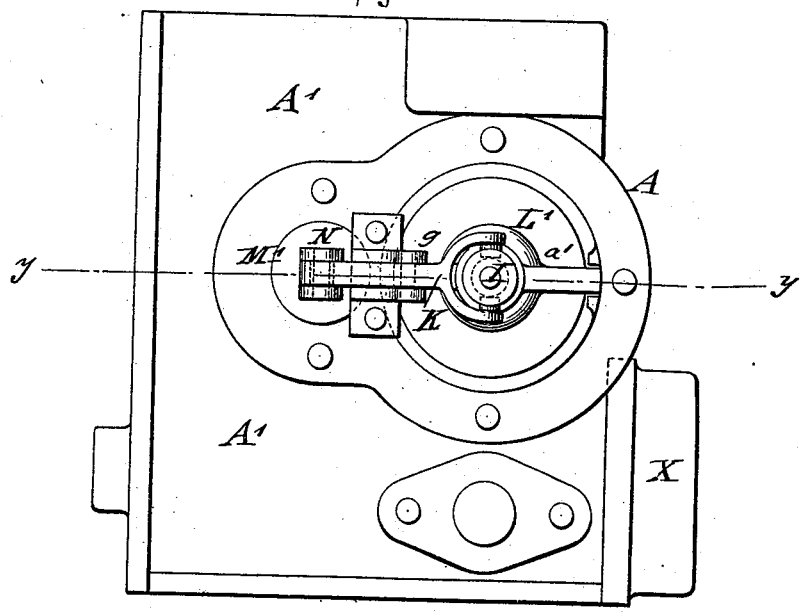

(No Model.) 4 Sheets—Sheet 1.
C. G. TOENSE.
PISTON WATER METER.
No. 354,613. Patented Dec. 21, 1886.
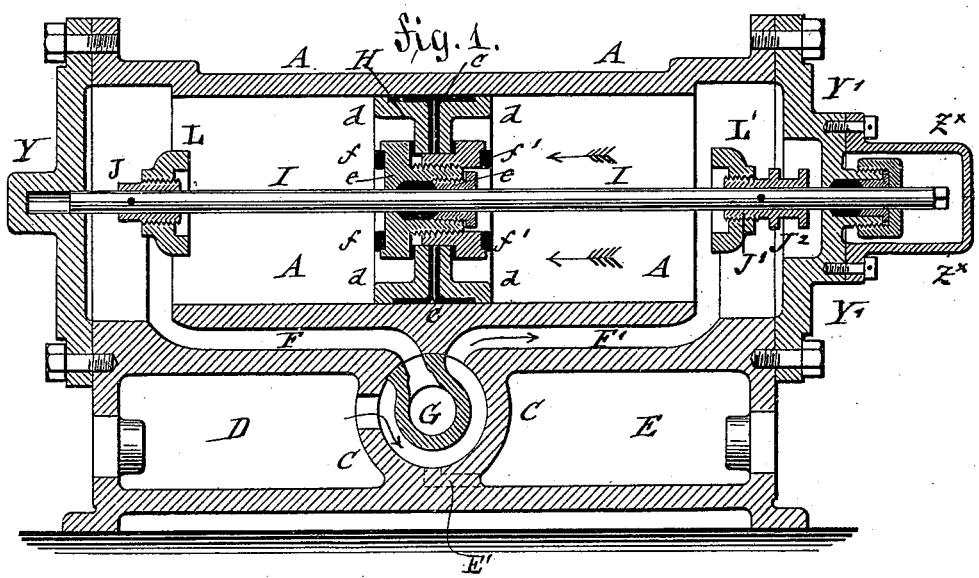
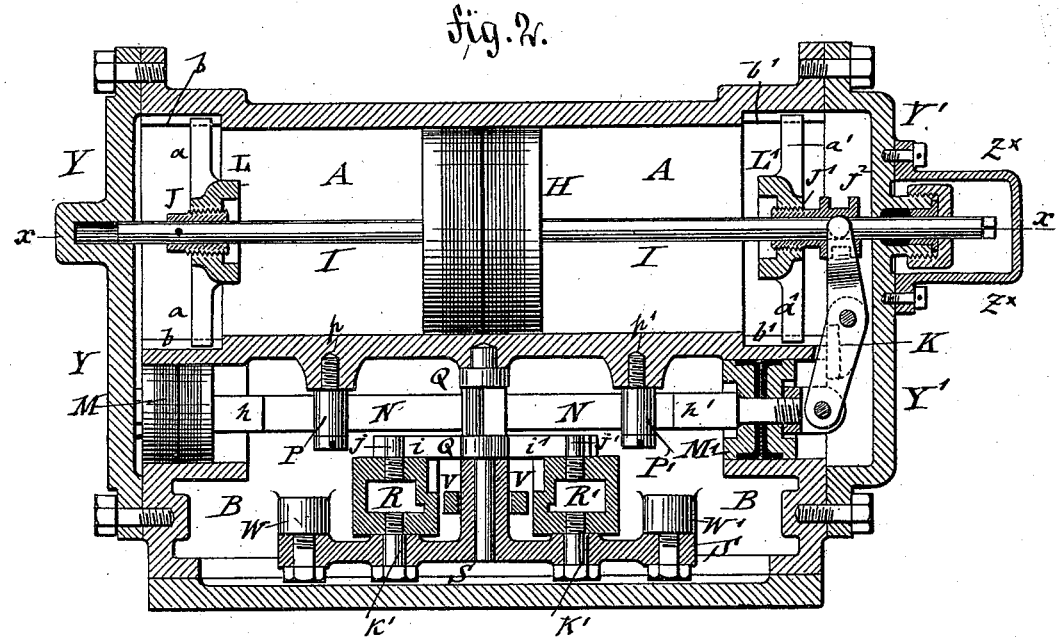
WITNESSES:
INVENTOR
Carl G. Toense
BY
Goepel & Raegener
ATTORNEYS.

(No Model.)

C. G. TOENSE.
PISTON WATER METER.

No. 354,613.

4 Sheets—Sheet 2.

Patented Dec. 21, 1886.

WITNESSES:

INVENTOR
Carl G. Toense
BY
Goepel & Raegener
ATTORNEYS.

(No Model.) 4 Sheets—Sheet 3.

C. G. TOENSE.
PISTON WATER METER.

No. 354,613. Patented Dec. 21, 1886.

WITNESSES:
H. H. Rosenbaum.
Sidney Mann

INVENTOR
Carl G. Toense
BY
Goepel & Raegener
ATTORNEYS.

(No Model.) 4 Sheets—Sheet 4.
C. G. TOENSE.
PISTON WATER METER.
No. 354,613. Patented Dec. 21, 1886.
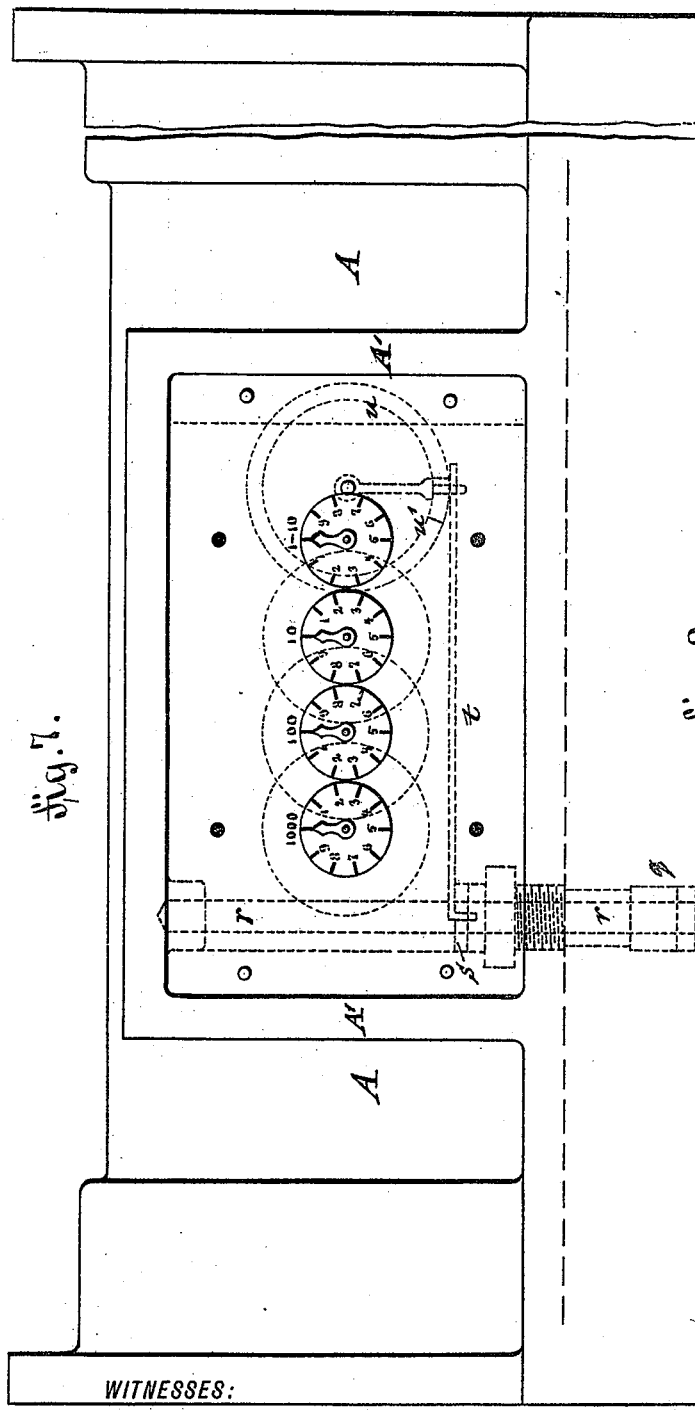
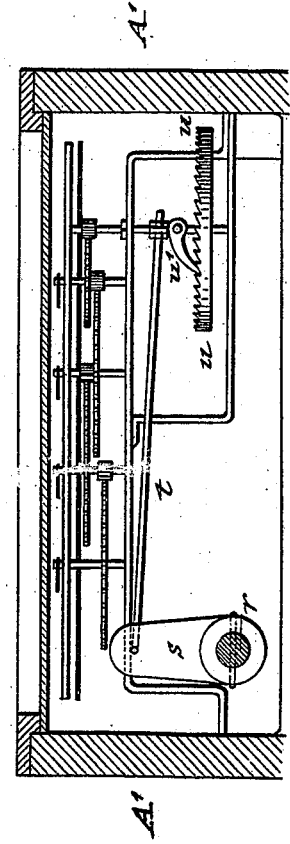
WITNESSES:
INVENTOR
Carl G. Toense
BY
Goepel Raegener
ATTORNEYS.

UNITED STATES PATENT OFFICE.

CARL G. TOENSE, OF CLEVELAND, OHIO.

PISTON WATER-METER.

SPECIFICATION forming part of Letters Patent No. 354,613, dated December 21, 1886.

Application filed February 10, 1886. Serial No. 191,437. (No model.)

*To all whom it may concern:*

Be it known that I, CARL G. TOENSE, of Cleveland, in the county of Cuyahoga, State of Ohio, have invented certain new and useful Improvements in Water-Meters, of which the following is a specification.

The water-meters heretofore in general use may be divided into plunger meters and in meters with rotary or so-called "reaction-wheels," in which an exact measuring of the water passing through the same is only obtained when they are finished in a highly-accurate manner, and then only when the pressure of the water to be measured remains uniform, as the same cannot be adjusted to different pressures. Without means for adjustment, however, these meters cannot work with that degree of accuracy which should be the main characteristic of a good meter. Other conditions for a successful water-meter are that it should be furnished at a comparatively low price, and that it should possess a high degree of resistibility against wear.

The object of this invention is to provide an improved water-meter that complies with the conditions referred to, and that measures accurately a certain determined quantity of water at each stroke without being influenced by the different pressures of the water, as the change of stroke takes place in a very short time, so as not to influence the accuracy of the meter. As the working mechanisms are arranged in a chamber sidewise of the main cylinder, these parts do not come in contact with the water to be measured, and can therefore be kept fully lubricated.

The invention consists of a water-meter which comprises a cylinder, a piston sliding loosely on a longitudinal piston-rod having fixed sleeves and adjustable collars or nuts, which form contact with elastic face-rings of the piston, a fulcrumed transmitting-lever operated by said piston-rod, a reciprocating plunger-rod having plungers and offsets, oscillating lever-arms operated by said plunger-rod, weights lifted alternately by said lever-arms, an anchor oscillated by said weights, a registering device operated by said anchor, and an oscillating hollow supply-valve having arms operated by the weights, said valve supplying alternately the water from the inlet-chamber by suitable channels to the opposite ends of the cylinder and to the outlet-chamber, whereby the regular working of the piston and the measuring of the water are produced, as will more fully appear hereinafter, and finally be pointed out in the claims.

Figure 4:
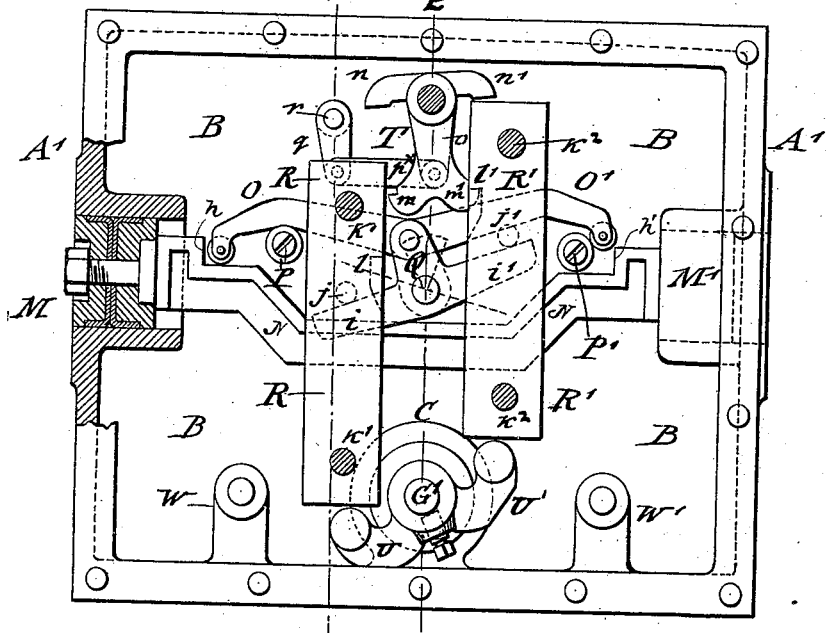
Figure 5:
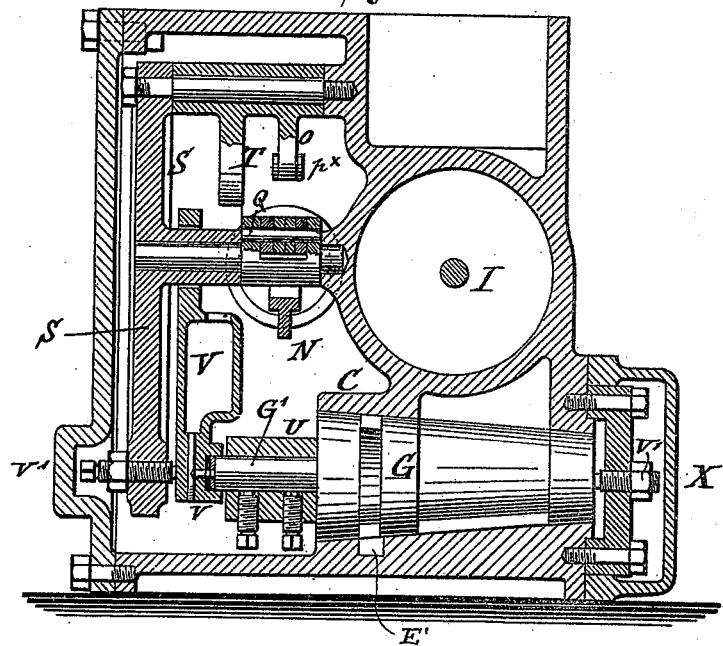
Figure 6:
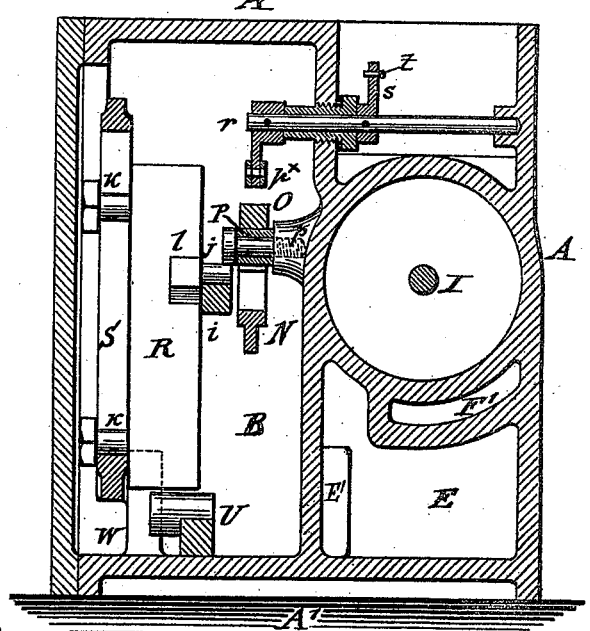

In the accompanying drawings, Figure 1 represents a vertical longitudinal section on line $x\ x$, Fig. 2, of my improved water-meter. Fig. 2 is a horizontal section on line $y\ y$, Fig. 3. Fig. 3 is an end elevation with the covering-head of the cylinder removed. Fig. 4 is a side elevation with the side and supporting plates removed to show the valve-motion. Figs. 5 and 6 are vertical transverse sections, respectively, on lines $z\ z$ and $k\ k$, Fig. 4; and Figs. 7 and 8 are respectively a top view and a sectional side view of the registering device of the meter.

Similar letters of reference indicate corresponding parts.

Referring to the drawings, A represents the cylinder; B, a chamber at one side of the same; C, the valve-seat, and D and E the inlet and outlet chambers, which are located below the cylinder and provided with inlet and outlet ports. From the valve-seat C extend channels F F' in opposite direction to the ends of the cylinder A. A hollow conical valve, G, is fitted into the valve-seat C, and provided with collars, an annular channel between said collars for the inlet of the water, and with a lateral channel for the discharge of the same, as shown in Figs. 1 and 5. From the interior of the conical valve G the water is conveyed to the outlet-chamber E through the channel E'. The oscillating valve G has been heretofore patented to me, No. 301,408, dated July 1, 1884, and forms no part of this application.

A piston-rod, I, extends centrally through the cylinder A, and is guided by a socket-recess of the head Y of the same, and by a stuffing-box arranged in the opposite head, Y'. The piston-rod I extends through the head Y' and its stuffing-box, and is made square at the outer end, so that it can be turned by a wrench. A cap, $Z^x$, protects the square end of the piston-rod I, said cap being preferably secured to the head Y' by screw-bolts or other suitable means. The piston-rod I is provided at the ends with sleeves J J', having, respectively, a left and a right hand exterior screw-thread, on which are screwed stop-nuts L L'. Both sleeves J J' are provided with diametrically-extending arms $a$ $a'$, that are guided in longitudinal grooves $b$ $b'$ at the ends of the cylinder A, so as to prevent the turning of the piston-rod I on its axis. The sleeve J' is provided with a grooved collar, $J^2$, that is engaged by the forked end of a fulcrumed lever, K, the opposite end of which extends laterally beyond the cylinder A, and is pivoted at that end to a plunger-rod, N. The piston H is placed loosely on the piston-rod I, and provided with a packing, $c$, of leather or metal, that is arranged between the glass or metal disks $d$ $d$. It is further provided with a stuffing-box, $e$, so that water cannot pass through from one end of the piston to the other. Rubber rings $f f'$ are arranged at opposite sides of the piston, by which the contact with the nuts L L' is softened and rendered noiseless.

The plunger-rod N is mounted with plungers M M', guided in short cylinders of the casing A', and bent so as to form rectangular offsets $h$ $h'$, which serve to transmit the motion of the plunger-rod alternately to the oscillating lever-arms O O'. These arms are provided at their ends with anti-friction rollers that bear against the offsets $h$ $h'$, said lever-arms resting on anti-friction rollers P P' of fixed pins $p$ $p'$, which rollers facilitate the moving of the levers O O' out of the path of the offsets $h$ $h'$ of the plunger-rod N.

The lever-rods O O' are pivoted to a short lateral crank-arm, Q, which is provided with arms $i$ $i'$ at right angles thereto, said arms forming contact with fixed pins $j$ $j'$ of the weights R R', so as to produce the alternating lifting of said weights. The weights R R' are provided with pins $k'$ $k^2$, which are guided in vertical slots of a guide-plate, S. (Shown in Figs. 2, 5, and 6.) The weights R R' are further provided with recesses $l$ $l'$ at their inner sides, which are alternately engaged by the noses $m$ $m'$ at the lower end of an oscillating anchor, T. The anchor T has at its upper ends two lateral arms, $n$ $n'$, and a central downwardly-extending crank-arm, $o$. The arms $n$ $n'$ serve for the purpose of oscillating the anchor T from one side to the other by the action of the weights R R', which abut alternately against the arms. The crank-arm $o$ transmits the motion of the anchor T by a connecting-rod, $p^\times$, arm $q$, spindle $r$, arm $s$, rod $t$, and pawl $u'$ on the ratchet-wheel $u$, and from the same to the train of registering-wheels, as shown in Figs. 4, 6, 7, and 8.

The oscillating motion of the valve G is effected by the alternating pressure of the weights R R' on the lateral arms U U', which are attached by a center sleeve and set-screws to the spindle G' of the valve G, as shown in Figs. 5 and 6. The inner end of the valve-spindle G' carries a lubricating-vessel, V, which is filled with glycerine, and which has the object of lubricating the valve-spindle, and, on being mixed with the water, entering by leakage into the side chamber, B, to lubricate all the parts in the same. The valve-spindle G' turns in bearings $v$ at the lower part of the receptacle V, and is retained in position by set-screws $v'$, as shown in Fig. 5. The end of the valve G is tightly closed by a cap, X. The guide-plate S is fitted against bosses W W' of the lower part of the casing A' and retained by the pivot of the anchor T at the upper part, as shown in Figs. 5 and 6.

The operation of my improved water-meter is as follows: The water is first passed through a screen, so as to be cleaned of coarse impurities, and is then conducted to the inlet-port of the chamber D, and from the same to the annular channel of the valve G and channel F' into the cylinder A, in which it presses against the piston H in the direction of the arrows shown in Fig. 1. The piston H is moved by the water against the contact-nut L, and carries thereby the piston-rod I sidewise. The piston-rod I oscillates thereby the lever K, so as to move the plunger-rod N and plungers M M' in opposite direction to the motion of the piston-rod I. The motion of the plunger-rod N raises by the offset $h$ and roller P the arm O and simultaneously lowers the arm O' by the receding of the offset $h'$. The action of the crank-arm Q and arm $i$ lifts the weight R until it abuts against the arm $n$ of the anchor T. The anchor T is thereby oscillated so that its left-hand nose, $m$, engages the recess $l$ of the weight R and holds the latter in raised position, while the right-hand nose, $m'$, releases the recess $l'$ of the weight R'. Simultaneously therewith the weight R' falls on the right-hand arm U', whereby the valve G is turned on its axis, so that its outlet-port communicates with the channel F', Fig. 1. During the shifting operation described the outflowing water passes from the channel F through the hollow interior space of the valve G and the side opening of the valve-seat (shown in Fig. 5) into the channel E', and thence into the outlet-chamber E, and from the same to the outlet-pipe. As soon as the shifting of the valve G is completed the water passes through the channel F into the cylinder A and moves the piston H to the right until it arrives at the extreme right-hand end of the cylinder, and shifts, by contact with the nut L', the piston-rod I, whereby the lever K, plunger-rod N, lever-arm O', and arm $i'$ are operated, so as to produce thereby the lifting of the weight R' and the lowering of the weight R, which latter imparts again an oscillating motion to the valve G in an analogous manner as before described. The oscillations of the anchor T and its crank-arm $o$ set the registering devices in motion, which thereby count the number of strokes of the piston and indicate the quantity of water passed through the cylinder. As the length of each stroke multiplied by the area of the piston produces the quantity of water passed through the meter at each stroke, and as the length of the stroke of the piston can be exactly regulated by turning the piston-rod I with a wrench, and setting thereby the contact-nuts L L' on the threaded sleeves of the piston-rod I nearer to or farther away from each other, the quantity of water passing through the cylinder at each stroke can be accurately determined, and thus the reliable and exact working of the meter secured.

Having thus described my invention, I claim as new and desire to secure by Letters Patent—

1. The combination of the cylinder, a centrally-guided piston-rod extending through one head of the cylinder, a reciprocating piston sliding loosely on said piston-rod, sleeves attached to the piston-rod, and having respectively a right and a left hand screw-thread, and adjustable contact collars or nuts arranged on said sleeves, whereby the position of the contact-collars on the piston-rod can be adjusted by axially turning the rod, substantially as set forth.

2. The combination of a cylinder, a centrally-guided piston-rod, a reciprocating piston sliding loosely on said piston-rod, said piston having a central stuffing-box and elastic face-rings, sleeves attached to the piston-rod, and arranged, respectively, with a right and left hand screw-thread, and contact collars or nuts located on said sleeves, and having radial arms guided in grooves of the cylinder, substantially as set forth.

3. The combination of a cylinder having inlet and outlet channels, a reciprocating piston, a centrally-guided piston-rod passing through the piston, adjustable contact nuts or collars on said piston-rod, a reciprocating plunger-rod having plungers and offsets, a fulcrumed lever connecting the piston and plunger rods, oscillating lever-arms, fixed pins having anti-friction rollers for lifting said arms, fulcrumed arms connected by a crank with said lever-arms, weights supported by the fulcrumed arms, an oscillating anchor engaging alternately the weights, and an oscillating supply and discharge valve having arms acted upon by said weights, so as to shift the valve at the end of each stroke of the piston, substantially as set forth.

4. The combination of a cylinder having inlet and outlet channels, a reciprocating piston, a centrally-guided piston-rod passing through said piston, a fulcrumed transmitting-lever, a plunger-rod pivoted to said lever and having plungers and offsets, oscillating lever-arms, an intermediate crank having lateral arms, weights actuated by said arms, an oscillating anchor having noses engaging said weights, an oscillating supply and discharge valve having arms acted upon by said weights, a registering device, and intermediate mechanism connecting the anchor with the primary wheel of said registering device, substantially as set forth.

5. The combination of the cylinder A, having channels F F', a reciprocating piston, H, a piston-rod, I, having adjustable contact-nuts L L', a fulcrumed transmitting-lever, K, a reciprocating plunger-rod, N, having plungers M M', and offsets $h\ h'$, lever-arms O O', anti-friction rollers P P', a crank-arm, Q, having lateral arms $i\ i'$, weights R R', having pins $j\ j'$, guide-pins $k\ k'$, and recesses $l\ l'$, a slotted guide-plate, S, an oscillating anchor, T, having noses $m\ m'$ and lateral arms $n\ n'$, and an oscillating valve, G, having arms U, acted upon by said weights, substantially as set forth.

6. The combination of the cylinder A, having channels F F', a reciprocating piston, H, a piston-rod, I, having adjustable contact-nuts L L', a fulcrumed transmitting-lever, K, a reciprocating plunger-rod, N, having plungers M M' and offsets $h\ h'$, lever-arms O O', anti-friction rollers P P', a crank-arm, Q, having lateral arms $i\ i'$, weights R R', having pins $j\ j'$, guide-pins $k\ k'$, and recesses $l\ l'$, a slotted guide-plate, S, an oscillating anchor, T, having noses $m\ m'$ and lateral arms $n\ n'$, and an oscillating valve, G, having arms U, acted upon by said weights, substantially as set forth.

7. In a slide-valve, the combination of a plunger-rod, N, having offsets $h\ h'$, means for actuating said plunger-rod, the bent lever-arms O O', provided in their outer ends with anti-friction rollers adapted to bear upon said offsets, a crank-arm, Q, to which the inner ends of said lever-arms are pivoted, anti-friction rollers P P', an oscillating valve, G, having lateral arms U, and mechanism connecting said crank-arm Q with said arms U, substantially as described.

In testimony that I claim the foregoing as my invention I have signed my name in presence of two subscribing witnesses.

CARL G. TOENSE.

Witnesses:
S. Q. KERRUISH,
J. C. MALADY.